United States Patent [19]
Pathakis et al.

[11] Patent Number: 5,946,467
[45] Date of Patent: Aug. 31, 1999

[54] APPLICATION-LEVEL, PERSISTENT PACKETING APPARATUS AND METHOD

[75] Inventors: Scott W. Pathakis, Sandy; Dale A. Lowry, Provo; Samuel F. Fletcher, Orem, all of Utah

[73] Assignee: Novell, Inc., Provo, Utah

[21] Appl. No.: 08/745,900

[22] Filed: Nov. 7, 1996

Related U.S. Application Data

[60] Provisional application No. 60/026,990, Sep. 20, 1996.

[51] Int. Cl.$^6$ .............................. G06F 13/38; G06F 15/17
[52] U.S. Cl. ...................................... 395/200.66; 370/474
[58] Field of Search ..................................... 370/474, 389; 395/200.58, 200.54, 200.3, 200.6, 200.66

[56] References Cited

U.S. PATENT DOCUMENTS

| | | | |
|---|---|---|---|
| 4,663,748 | 5/1987 | Karbowiak et al. | 370/89 |
| 5,277,188 | 1/1994 | Selker | 128/696 |
| 5,295,256 | 3/1994 | Bapat | 395/500 |
| 5,351,276 | 9/1994 | Doll, Jr. et al. | 379/67 |
| 5,452,299 | 9/1995 | Thessin et al. | 370/62 |
| 5,481,704 | 1/1996 | Pellicano | 395/600 |
| 5,493,638 | 2/1996 | Hooper et al. | 395/135 |
| 5,499,359 | 3/1996 | Vijaykumar | 395/600 |
| 5,517,605 | 5/1996 | Wolf | 395/155 |
| 5,526,520 | 6/1996 | Krause | 395/600 |
| 5,537,549 | 7/1996 | Gee et al. | 395/200.3 |
| 5,625,693 | 4/1997 | Rohatgi et al. | 380/23 |
| 5,761,429 | 6/1998 | Thompson | 395/200.54 |
| 5,786,770 | 7/1998 | Thompson | 395/200.58 |

OTHER PUBLICATIONS

HPAPPS0371, "Compare," Hewlett Packard manual excerpt, SPI Database of Software Technologies, ©1995 Software Patent Institute, two pages.

HPAPPS.3042, "Copyrite", Hewlett Packard manual excerpt, SPI Database of Software Technologies, ©1995 Software Patent Institute, one page.

"BLOBs and Object–oriented Database Engines," *Dr. Dobb's Journal*, Dec., 1992, pp. 90, 92 and 94.

"Object Based Architecture for Multimedia Data Sources," *IBM Technical Disclosure Bulletin*, vol. 37, No. 11, Nov. 1994, pp. 521–522.

John Voelcker, "Helping Computers Communicate", IEEE, 1986.

*Primary Examiner*—Mark H. Rinehart
*Attorney, Agent, or Firm*—Madson & Metcalf

[57] ABSTRACT

A persistent packet provides a wrapper that may be interpretable by an application, a packeting process, a database engine, or a device intermediate a sending device and a receiving device. Accordingly, the packet may be transferred and stored without changing the packet structure. The wrapper contains a header for rapid transfer of the packet with no need for any machine or process to open the packet and access the substantive data contained therein. The wrapper also contains application-specific data that may be interpreted by the packeting process or the application, or both. The application-specific data pertains to the substantive data contained in the packet and may be used by an application in determining how to dispose of a packet. For example an application may determine whether to store, open, discard, etc. the packet. The application-specific data may also be used by an application in a process of disposition of a packet. Both the header and application-specific data in the wrapper may be persistent across processes and apparatus. An application may "sub-contract" packeting to a separate packeting process, yet the application remains the "owner" of the packet.

39 Claims, 14 Drawing Sheets

APPLICATION-LEVEL, PERSISTENT PACKETING APPARATUS AND METHOD

This application claims benefit of Provisional application No. 60/026,990 filed Sep. 20, 1995.

BACKGROUND

1. The Field of the Invention

This invention relates to data transfer between databases and applications and, more particularly, to novel systems and methods for creating packets of data to be transferred between processes operating on digital computers.

2. The Background Art

Whenever two processes are operating, particularly when the two processes are hosted in different (remote) computers, transfer of data between the processes is an important process in and of itself. Each computer must have certain information, such as formatting, protocols and the like, required for passing data. Using available protocols, two computers may negotiate a format to be used for passing data therebetween.

With the growth of modern network technology, networks may be comprised of numerous application routers into an internetwork. Accordingly, a packet of data, transferred between two computers, may pass through several hops (application routers) between a sender and a receiver. Accordingly, extended time may be involved. Packets may be lost, corrupted, dropped due to excessive time delay, or the like.

Moreover, an application may have pieces or processes that operate at different locations on different computers. For example, a client process may be executed by one computer in an internetwork, while a corresponding server process is executing in a computer elsewhere in the internetwork. Similarly, two individual clients within an application may have need of similar or identical data. In general, data transfer occurring between two computers, or two processes remote from one another, may need to transfer data. Accordingly, some format must be negotiated and agreed upon between these processes. Transfer protocols for packets are typically embodied within some executable code hosted in a sender and a receiver. Accordingly, only limited options for packet configuration are allowable. Moreover, whenever a new packeting format is desired, a corresponding protocol must be installed in a source machine and a destination machine before the protocol may be implemented.

Data formats may be changed periodically for certain processes. Nevertheless, not every process in a group of related, inter-communicating, processes will be updated at the same time. Therefore, certain processes are incapable of receiving or transferring data in accordance with some recently updated format. Conventionally, each process that handles data involved in a transfer needs to parse through the data. Accordingly, each computer handling transferred data needs to understand the format of the data.

What is needed is a standardized packet. A standardized packet needs to provide some minimal amount of application-related data sufficient to consummate transfer. However, such a packeting format needs to have a wrapper structure that does not require every involved computer participating in a transfer to parse the data.

BRIEF SUMMARY AND OBJECTS OF THE INVENTION

In view of the foregoing, it is a primary object of the present invention to provide a method and apparatus for implementing a packet protocol that encapsulates substantive data in a wrapper requiring minimal interaction with a transferring application.

It is an object of the invention to provide a persistent packet that may be stored in a database, or moved from process to process without modification.

It is an object of the invention to provide application-specific heading data within a packet containing substantive data.

It is an object of the invention to provide optional compression, encryption, and integrity checks, as well as verification or authentication for each packet.

It is an object of the invention to provide persistence of packets beyond a transfer process, including storage and retrieval in a storage device, hosting a database or other memory structure.

It is an object of the invention to provide a packet adaptable to contain verification data that may be used by a receiving computer to verify or authenticate origination of a packet, including features such as version, originating source, and the like.

Consistent with the foregoing objects, and in accordance with the invention as embodied and broadly described herein, a method and apparatus are disclosed in one embodiment of the present invention as including a protocol and a process for implementing that protocol within a digital computer. The process provides a method for creating persistent packets that may be transferred between processes and stored in a storage device such as a hard drive, random access memory, and the like. The packets may be stored in nonvolatile storage devices hosting databases and other permanent data structures.

An apparatus made in accordance with one embodiment of the invention may include a packet comprising a wrapper and substantive data. The wrapper may contain application-specific data associated with the transfer and storage of the substantive data by or for processes of the application. For example, application-specific data may include any data that may be useful to an application in processing substantive data. This may include security data, origination data, blob-specific information, or the like. In one embodiment, application-specific data in a packet created in accordance with the invention may be repeated in order to enable inclusion in the packet of differing types of data and different application-specific data.

In one embodiment, a packet in accordance with the invention may include a header in the wrapper of the packet. The header may provide a generalized, even universal data structure enabling transfer and storage without reading or interpretation of application-specific data or substantive data in the packet. A header may include information such as an identifier corresponding to a header and indicating the format thereof, a packet length, a wrapper length enabling ready interpretation of a wrapper and division of the wrapper from the substantive data, a packet type, and the like. Moreover, the header may include source data length. This length may be useful for verification of integrity of data following decompression. An application may use the length to determine the total number of bytes in the substantive data. The header may also include flags indicating a user's decision to compress, encrypt for security, authentication, or the like, or to verify the integrity of a packet by the use of a checksum. A checksum may be provided in order for an executable to operate in accordance with a checksum flag. Likewise, a flag may indicate some particular method of integrity verification such as a cyclic redundancy check (CRC), conventional checksum, or one of the plethora of other mechanisms available.

Substantive data may be any data that has conventionally been transferred between processes. In a method and apparatus in accordance with the invention, the substantive data has been abstracted or removed from transferring processes. That is, a process participating in a transfer either as a sender, receiver, or intermediary, in any particular transfer, may not need to have access to the substantive data. A sender may be a creator, but need not be, inasmuch as a packet may be persistent.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

The presently preferred embodiments of the invention will be best understood by reference to the drawings, wherein like parts are designated by like numerals throughout.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 14, is not intended to limit the scope of the invention, as claimed, but is merely representative of the presently preferred embodiments of the invention.

Figure 1:
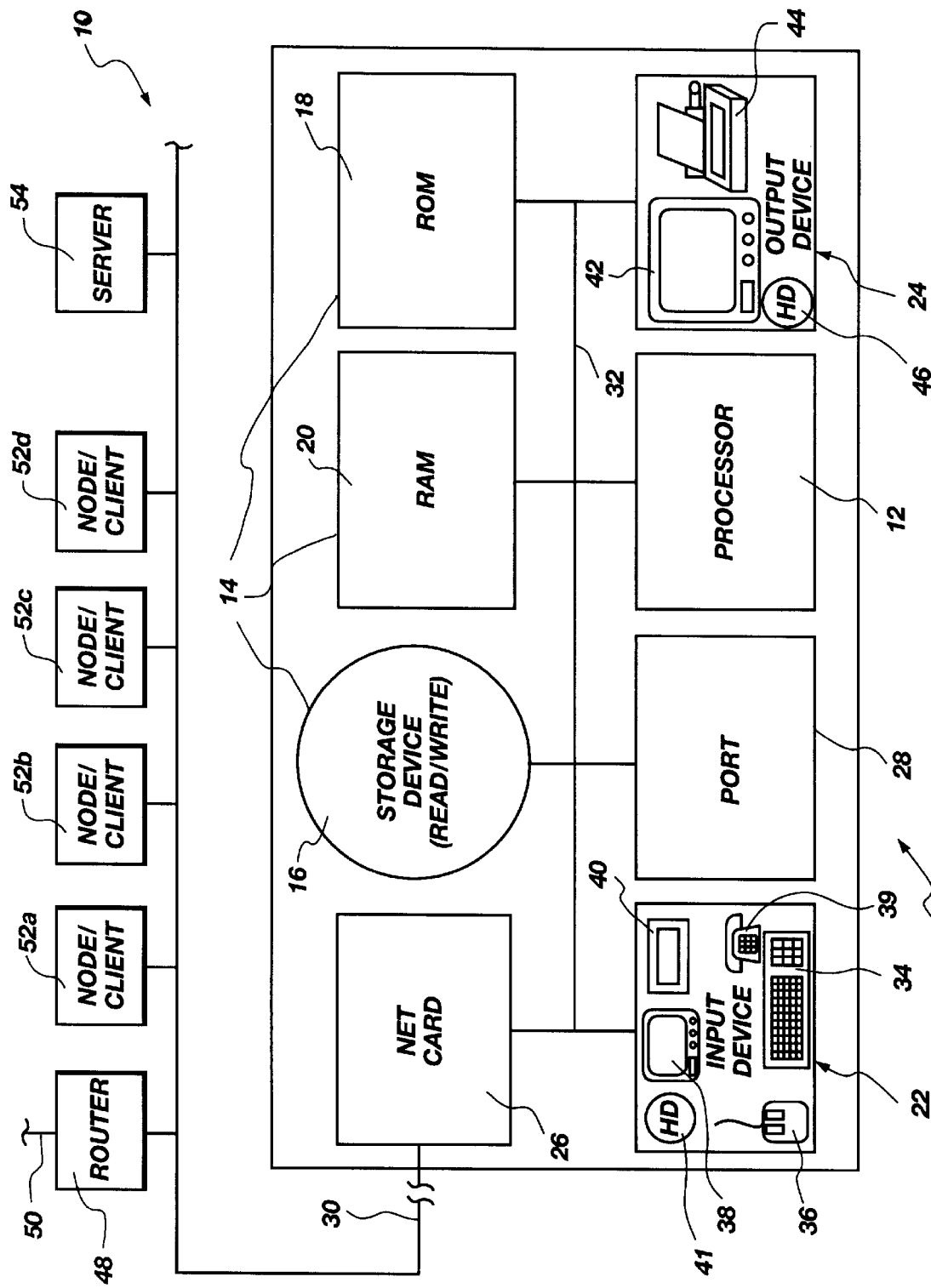
FIG. 1 is a schematic block diagram of an apparatus in accordance with the invention.

The presently preferred embodiments of the invention will be best understood by reference to the drawings, wherein like parts are designated by like numerals throughout. FIG. 1 is a schematic block diagram which illustrates an apparatus in accordance with the invention, wherein executables and applications, operating in accordance with the invention, may be hosted on one or more nodes 11, 52 in a network 30 or networks 30, 50.

FIGS. 2–14 are schematic block diagrams which illustrate more details of certain embodiments of modules, executables, and data for operating the apparatus of FIG. 1 in accordance with the invention. FIGS. 2–14 illustrate features and functions available for use in creating and transferring persistent packets suitable for storage and effective to reduce intervention by processes and computers handling packets.

Those of ordinary skill in the art will, of course, appreciate that various modifications to the detailed schematic diagrams of FIG. 1–14 may easily be made without departing from the essential characteristics of the invention, as described. Thus, the following description of the detailed schematic diagram of FIGS. 1–14 is intended only by way of example. It simply illustrates certain presently preferred embodiments of the invention as claimed herein.

Referring now to FIG. 1, an apparatus 10 may include a node 11 (e.g., client 11, computer 11) containing a processor 12 or CPU 12. The CPU 12 may be operably connected to a memory device 14. A memory device 14 may include one or more devices such as a hard drive or other non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 41 may be used as an input device whether resident within the node 11 or some other node 52 on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g., 52*a*, 52*b*, 52*c*, 52*d*) may have various communication capabilities.

In certain embodiments, a minimum of logical capability may be available in any node 52. Note that any of the individual nodes 52*a*–52*d* may be referred to, as may all together, as a node 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
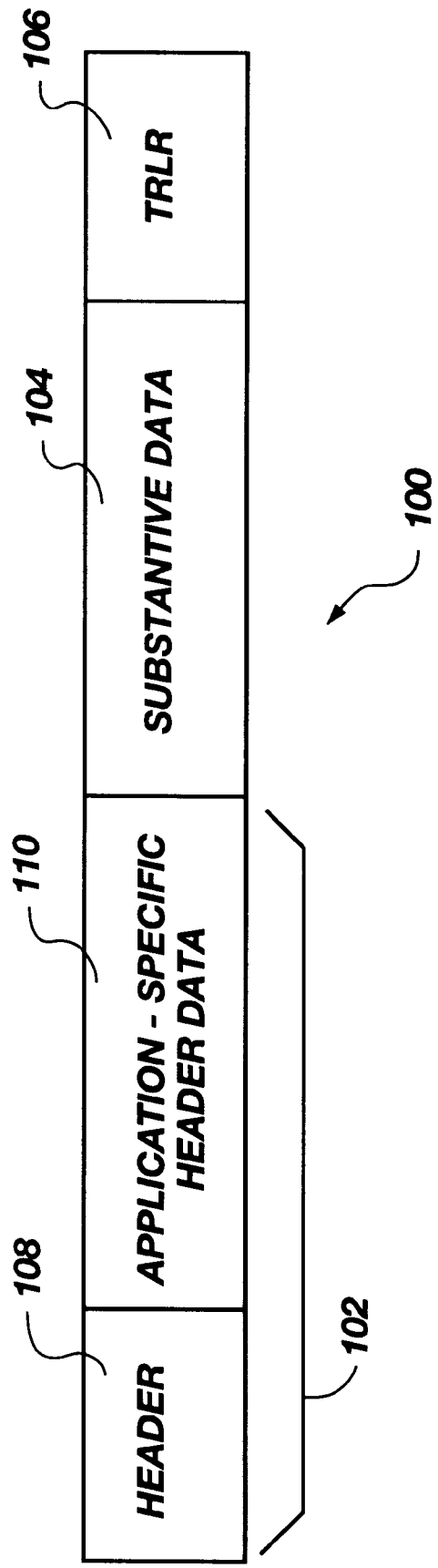
FIG. 2 is a schematic block diagram of a packet configured in accordance with the invention.

Referring now to FIG. 2, a packet 100 for transferring data is illustrated. The packet 100 may be persistent before and after a transfer process, contrary to data transfer structures known in the prior art. The packet 100 may include a wrapper 102. The wrapper 102 may be created to enable an application to determine how to best handle a packet 100. An application may be better off not parsing through the entire substantive data 104, and may even determine to dispose of a packet 100 by some criterion within the application. A trailer 106 may be attached to the end of a packet 100 to support functions such as an integrity check, browsing in a reverse direction through a chain of several packets 100, or the like.

The header 108 functions to control the format of the entire packet 100. For example, header 108 may contain information directed to a version of a packet protocol, and information identifying to a using application parameters regarding length or size, type, and so forth. Such information may be useful to an application in determining how to dispose of a packet 100.

Application-specific header data 110 is data related to the substantive data 104, and useful to an application running on the processor 12, in determining how to handle the substantive data 104. Handling by an application might include determinations of what application or node 52, 11 controls or "owns" the substantive data 104, security information such as public or private key data, parameters for controlling methods of processing the substantive data 104, and the like.

Figure 3:
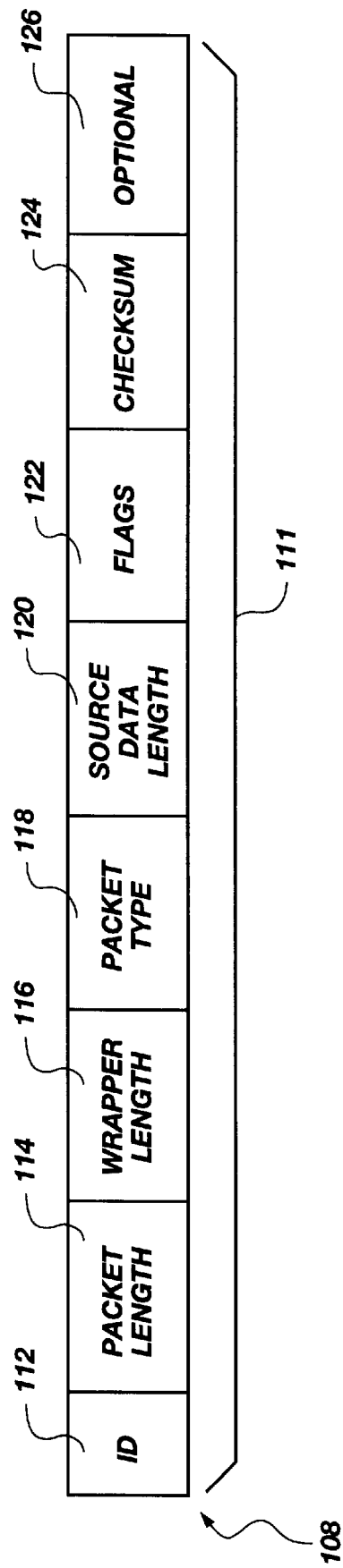
FIG. 3 is a schematic block diagram of the packet header illustrated in FIG. 2.

Referring now to FIG. 3, the header 108 may include a plurality of elements 111, which may be included therein. An identifier 112 may identify the individual packet 108 uniquely. The identifier 112 may be provided by the assemble packet module 168 (see FIG. 6) for each packet 100 created.

A packet length 114 may identify the total length of a packet 100 to an application 140 (see FIG. 5) and to an unassemble packet 172, as well as an assemble packet 168 in a BCEF module 146 (alternating referred to as a packeting module 146). A wrapper length 116 identifies to an application 140 the starting point of the substantive data 104. The wrapper length 116 may not be required. In one embodiment, a wrapper length 116 may be included as a redundant data element 111 to improve the speed of processing a packet 100.

A packet type 118 may be used by an application 140, as well as the assembly packet 168 and unassemble packet 172. The packet type 118 provides a classification of an entire packet 100 for purposes of determining a proper processing method. For example, a packet type 118 may indicate whether a packet 100 contains information to be passed between a client 52 and a server 54. The type 118 may indicate whether the substantive data 104 is binary large object (BLOB) data intended for storage in a database.

A source data length 120 may indicate an uncompressed length of the substantive data 104 contained in a packet 100. The source data length 120 may be used for verification. Alternatively, the source data length 120 may be used by the application 140, the assembly packet 168, or unassemble packet 172 for controlling random access data storage. For example, the assemble packet 168 may write the source data length 120 used in the header 108. The unassemble packet 172 may read the source data length 120 to determine how much substantive data 104 should be decompressed. An application 140 may use the source data length 120 to determine how much data 104 is in a packet 100.

Various flags 122 may be provided. Flags 122 may control encryption, compression, and verification. The BCEF module 146, itself containing several BCEF modules 156–172, may set the flags 122, and use or consume the flags 122 in various operations. For example, a flag 122 may be used to indicate additional high level attributes of a packet 100.

A checksum 124 may be included for verification of the integrity of a packet 100. Various methods of verifying integrity exist, including cyclic redundancy check (CRC) exclusive or in a bitwise checksum, or the like. In addition, other elements 111 may include optional elements 126 developed by a user or provided by a using application 140. Applications 140 using a packet 100 may "agree" between one another on a header 108, including any additional optional elements 126.

Figure 4:
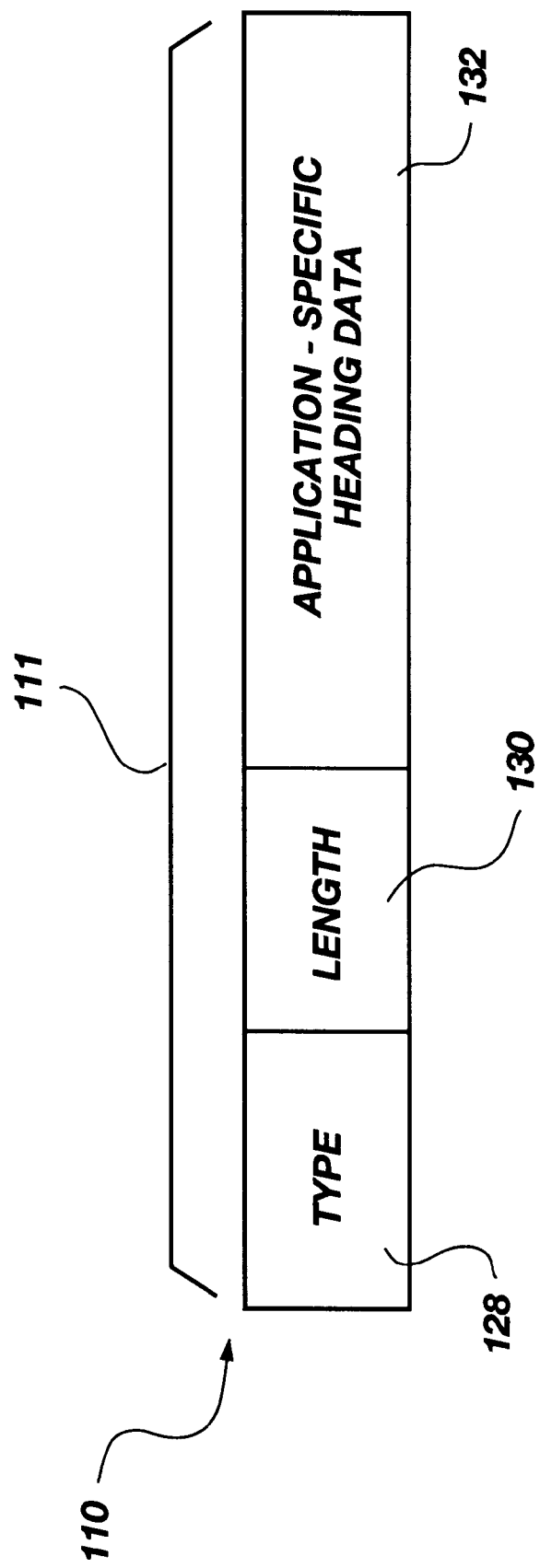
FIG. 4 is a schematic block diagram of an application-specific header data block illustrated in FIG. 2.

Referring now to FIG. 4, an application-specific header data 110 may be included in a wrapper 102. In one embodiment, the data 110 may follow the header 108. The application-specific header data 110 may include several elements 111 such as a type 128, a length 130, as well as application-specific heading data 132. The application-specific header data 110 may be optional, and may be repeated. For example, BLOB data may not require the data 110 to be included in every packet 100 associated with a single BLOB. That is, a leading packet 110 may contain the data 110, while subsequent packets 100 need not include that redundant application-specific heading header data 110. Alternatively, a leading packet 100 of several packets 100 which together contain the entire substantive data 104 associated with a single BLOB, may include repeated application-specific header data 110 in multiple blocks. For example, one set of elements 111 may be devoted to each of an original file name of the substantive data 104, a document profile associated with the BLOB, if the BLOB is a document, file management system information associated with the substantive data 104, data base information referring to the substantive information 104, and the like. Thus, information that may be useful to an application 140 in effectively using substantive data 104, may be provided in application-specific header data 110.

As a practical matter, in one embodiment, application-specific header data 110 may include a type 128 defined by an application 140 itself, or several applications 140 that might exchange the packet 100. In some embodiments, an application 140 may not recognize a type. 128, and may thus ignore this element 111.

A length 130 may simply characterize the length of the application-specific header data 110. The application-specific heading data 132 may be that information that an application 140 may put or get in operating on the substantive data 104. Thus, the BCEF module 146 need not parse through the application-specific heading data 132.

Figure 5:
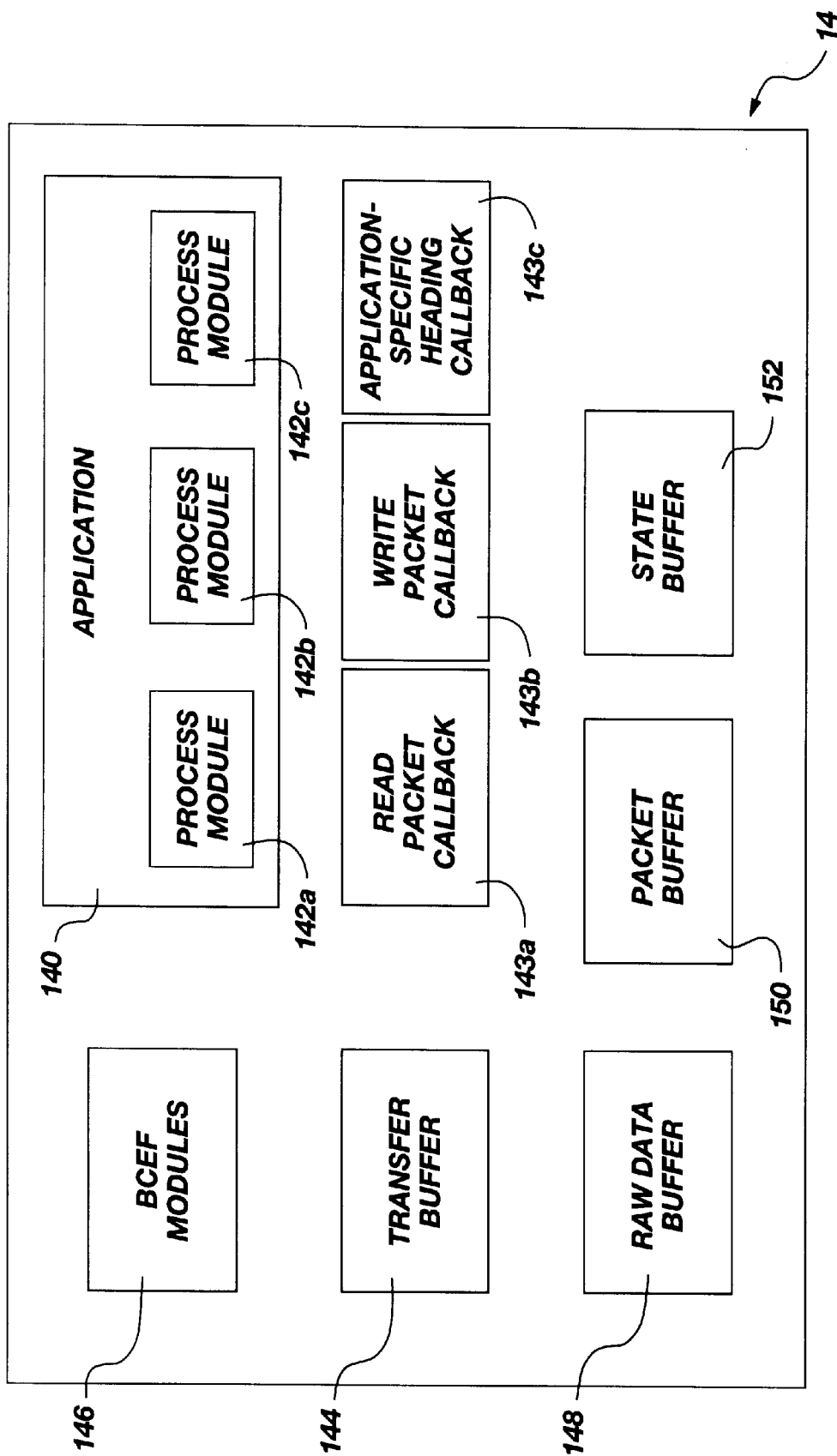
FIG. 5 is a schematic block diagram of a memory device of FIG. 1, illustrating storage of executable modules and data stores.

Referring now to FIG. 5, a memory device 14 may include executables and data for use by the processor 12 in creating and transferring packets 100. The node 11 containing the processor 12 is illustrated in FIG. 1, by way of example. That is, any of the nodes 52 may operate as the node 11. Moreover, a processor 12 in a node 52 may communicate with a processor 12 in a node 11, or on another network 50. Moreover, an application may have portions, corresponding to one another, operating on multiple computers 11, 50, 52, 54 and communicating packets 100 therebetween.

In one presently preferred embodiment of an apparatus and method in accordance with the invention, an application 140 may include one or more processes 142. The processes 142a, 142b, 142c, may communicate with applications 140 in other computers or between themselves. The memory device 14 may store several callback executables 143. For example, the callback modules 143 may be written by an application 140 and registered with the BCEF modules 146. The application 140 may report back to the BCEF modules 146 upon completion or failure of execution of a callback module 143.

The callback modules 143 enable an application 140 to remain in control of control, storage, transfer, and the like, of all packets 100 to and from an application 140. Accordingly, the BCEF modules 146 interface with the application 140 through the callback modules 143. Therefore, the BCEF modules 146, may become, effectively, executables under the control of the application 140. The callback modules 143 provide additional flexibility in an application 140 without having to interface directly with BCEF modules 146. The read packet callback module 143a may have responsibility to place an entire packet 100 in a packet buffer 150. A write packet callback module 143b may have responsibility to take a packet 100 from a packet buffer 150 and dispose of the packet 100 in accordance with direction from the application 140. The application-specific heading callback 143c may have responsibility to evaluate the application-specific heading data 132. The application-specific heading callback module 143c receives the application-specific heading data 132 from the BCEF modules 146. For example, an unassemble packet 172 may execute a call to the application-specific heading callback module 143c, along with the application-specific heading data 132. Inasmuch as the module 143c is "owned" by the application 140, data received by the module 143c enables the application 140 to prepare for an incoming packet 100, such as by setting encryption keys, creating a new BLOB location to receive incoming substantive data 104, or the like.

BCEF modules 146 may be loaded into the processor 12 to create a state machine. Accordingly, each of the modules 146 has a specific function further described in connection with FIG. 6 below.

A transfer buffer 144 pertains to the application 140 and temporarily stores raw data that may be sent to or received from the raw data buffer 148. The transfer buffer 144 also may contain application-specific heading data 132 that will be transferred to and from a packet 100 in the packet buffer 150. The raw data buffer 148 may hold substantive data 104. The raw data buffer 148 is allocated in the memory device 14 by the BCEF modules 146. Likewise, the packet buffer 150 and state buffer 152 may be allocated in the memory device 14 by the BCEF modules 146. Packet buffer 150 may be used to store packets 100 during assembly or disassembly. The state buffer 152 may contain data structure that control the state parameters and values associated with all BCEF modules 146.

Figure 6:
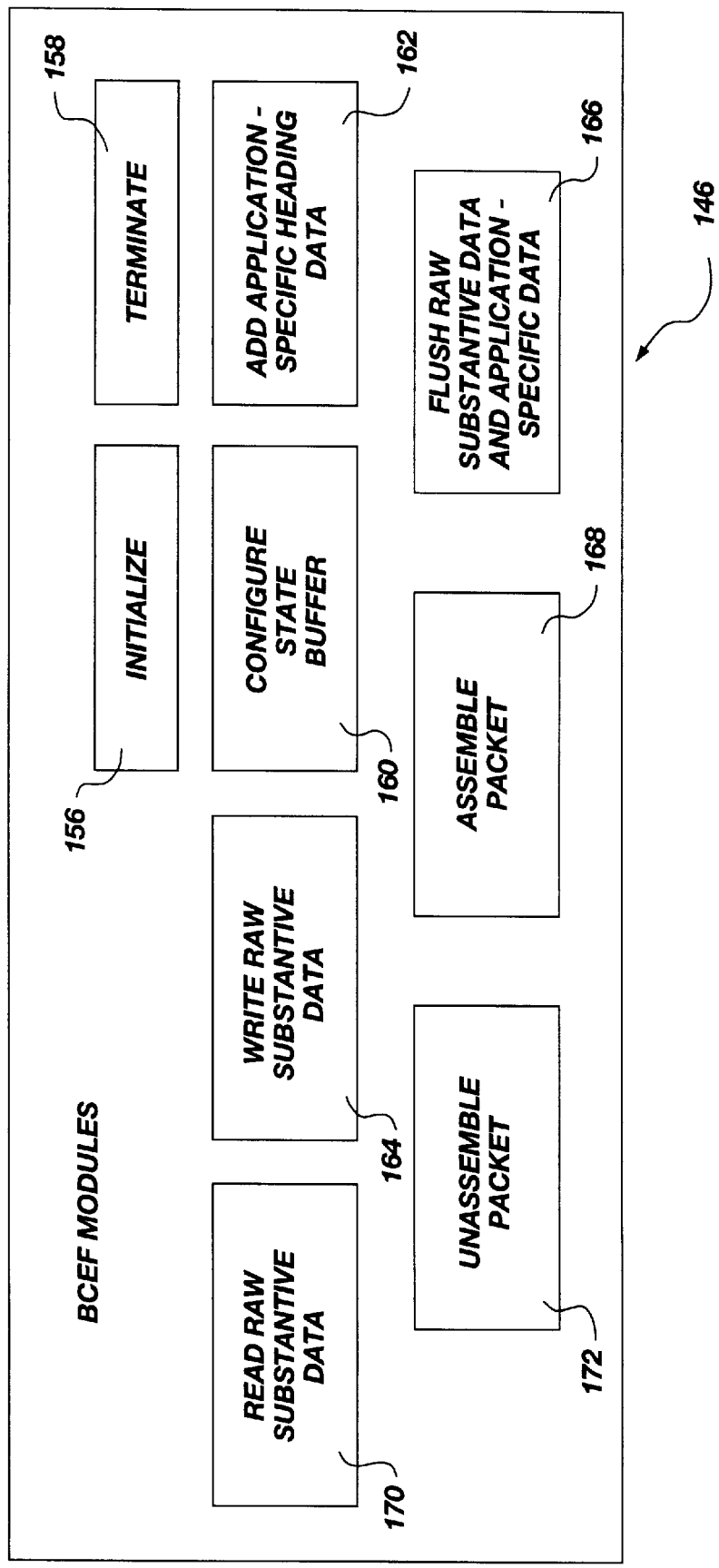
FIG. 6 is a schematic block diagram of the binary compressed encrypted format (BCEF) modules in accordance with FIG. 5.

Referring now to FIG. 6, the BCEF modules 146 may actually include several individual modules 146. Modules 146 may include an initialize 156, a terminate 158, configure state buffer 160, add application-specific heading data 162, write raw substantive data 164, flush raw substantive data and application-specific data 166, assemble packet 168, read raw substantive data 170 and unassemble packet 172 modules. These modules 146 may be referred to as the initialize 156, terminate 158, configure 160, add 162, write 164, flush 166, assemble 168, read 170 and unassemble 172 modules, respectively. The longer identifying names of each of the modules 146 are descriptive of the functionality of the modules 146. Further details of the modules 146 are described below in association with FIGS. 8–14.

Figure 7:
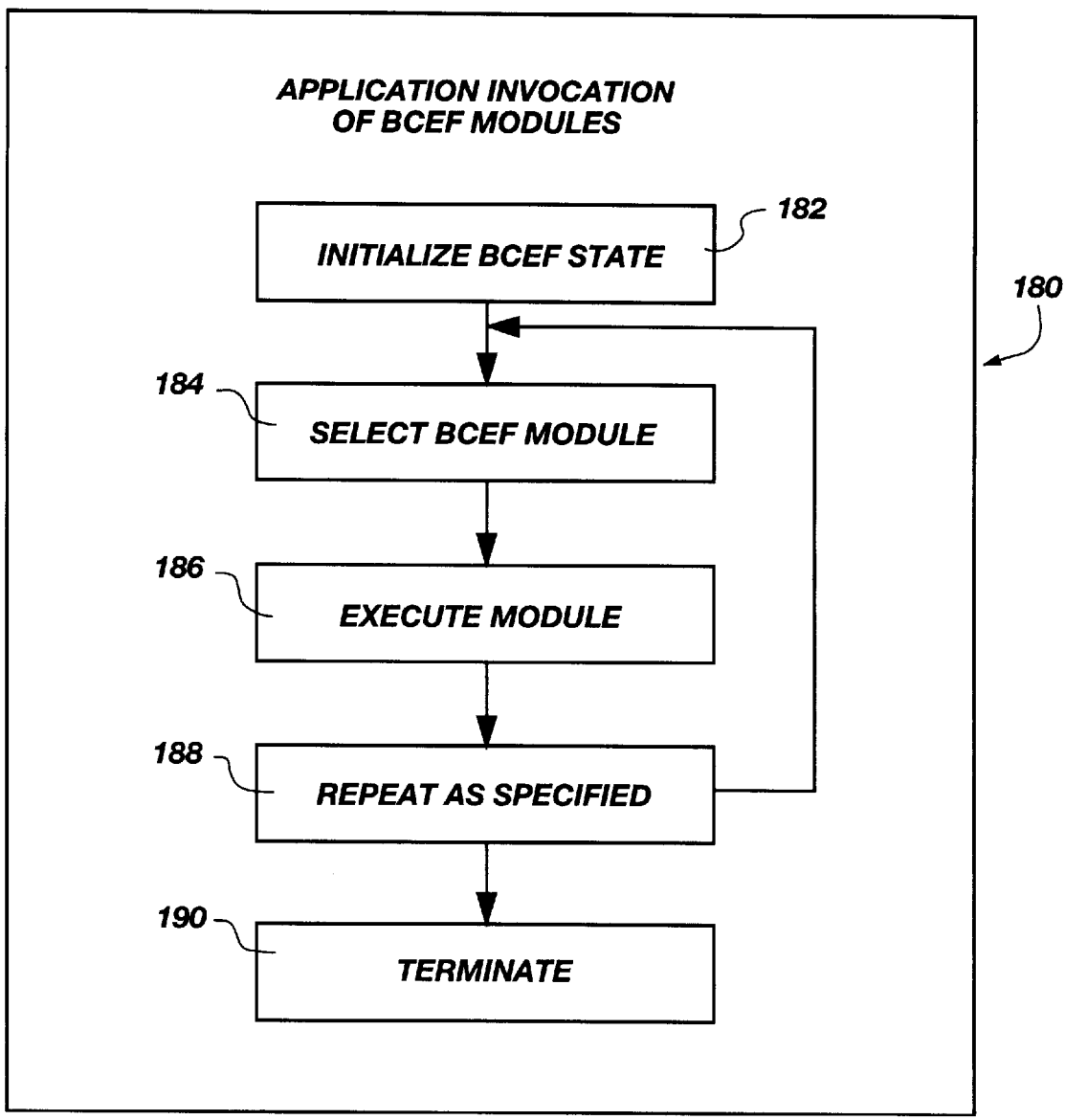
FIG. 7 is a schematic block diagram of a method implementing a binary compressed encrypted format (BCEF) data packet adapted to be persistent within a storage device.

Referring now to FIG. 7, a method 180 in accordance with the invention may provide for invocation of a BCEF module 146 by the application 140. Any of the BCEF modules 146 may be invoked (called) by the application 140 in virtually any order. The method 180 may contain an initialize BCEF state step 182 or initialize 182. After execution of the initialize step 182, a select step 184 may select a BCEF module to be executed. After an execution step 186 in which a select module 146 is executed in the processor 12, a repeat step 188 may return the processor 12 to select another module to select 184 another module 146. The initialized module 156 and terminate module 158 may not be accessed by the select step 184. Whenever an application 140 communicates to the BCEF module terminate 158 that no further execution steps 186 are to be completed, the terminate step 190 may be invoked.

Figure 8:
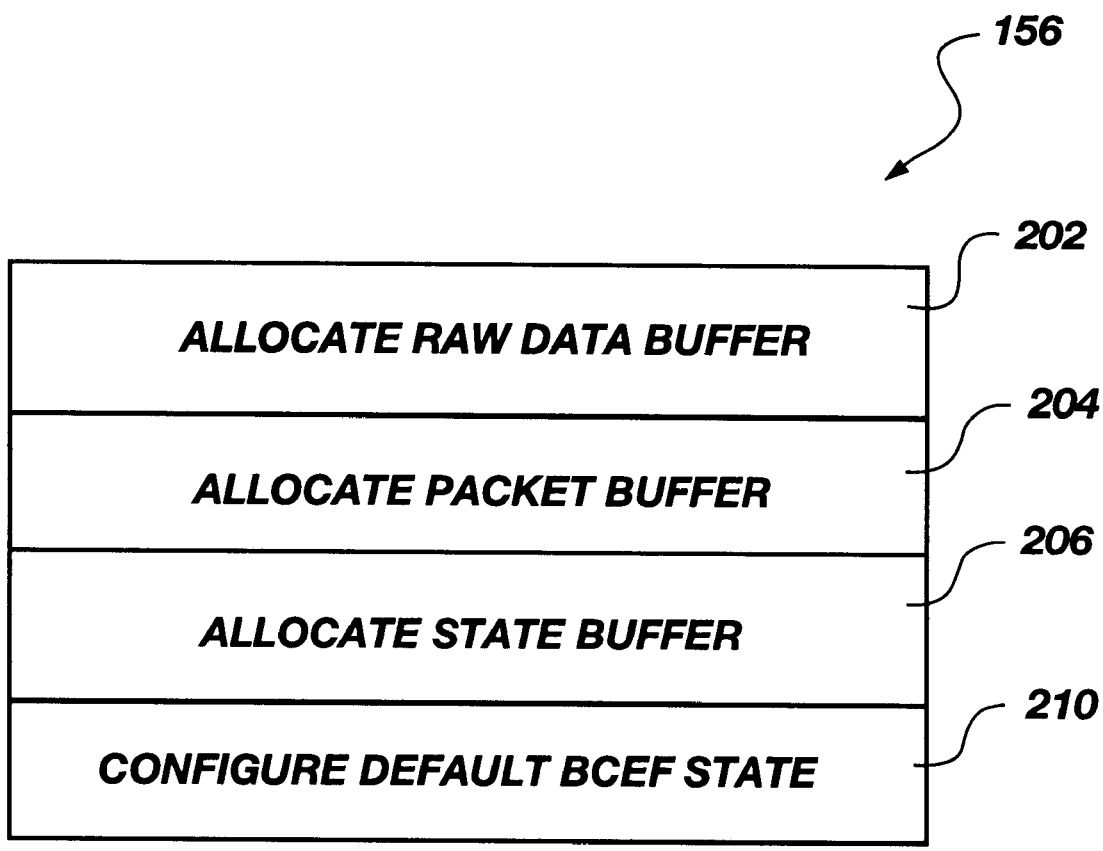
FIG. 8 is a schematic block diagram of the initialization process of FIG. 7.

Referring now to FIG. 8, the initialize step 182 may invoke the initialize module 156. The initialize module may include an allocation 202 of the raw data buffer 148, an allocation 204 of the packet buffer 150, and an allocation 206 of the state buffer 152. The allocate steps 202, 204, 206, provide blocks in the memory device 20 for storing the respective buffers 148, 150, 152. A configure executable 210 may configure a default state for each of the BCEF modules 146.

Figure 9:
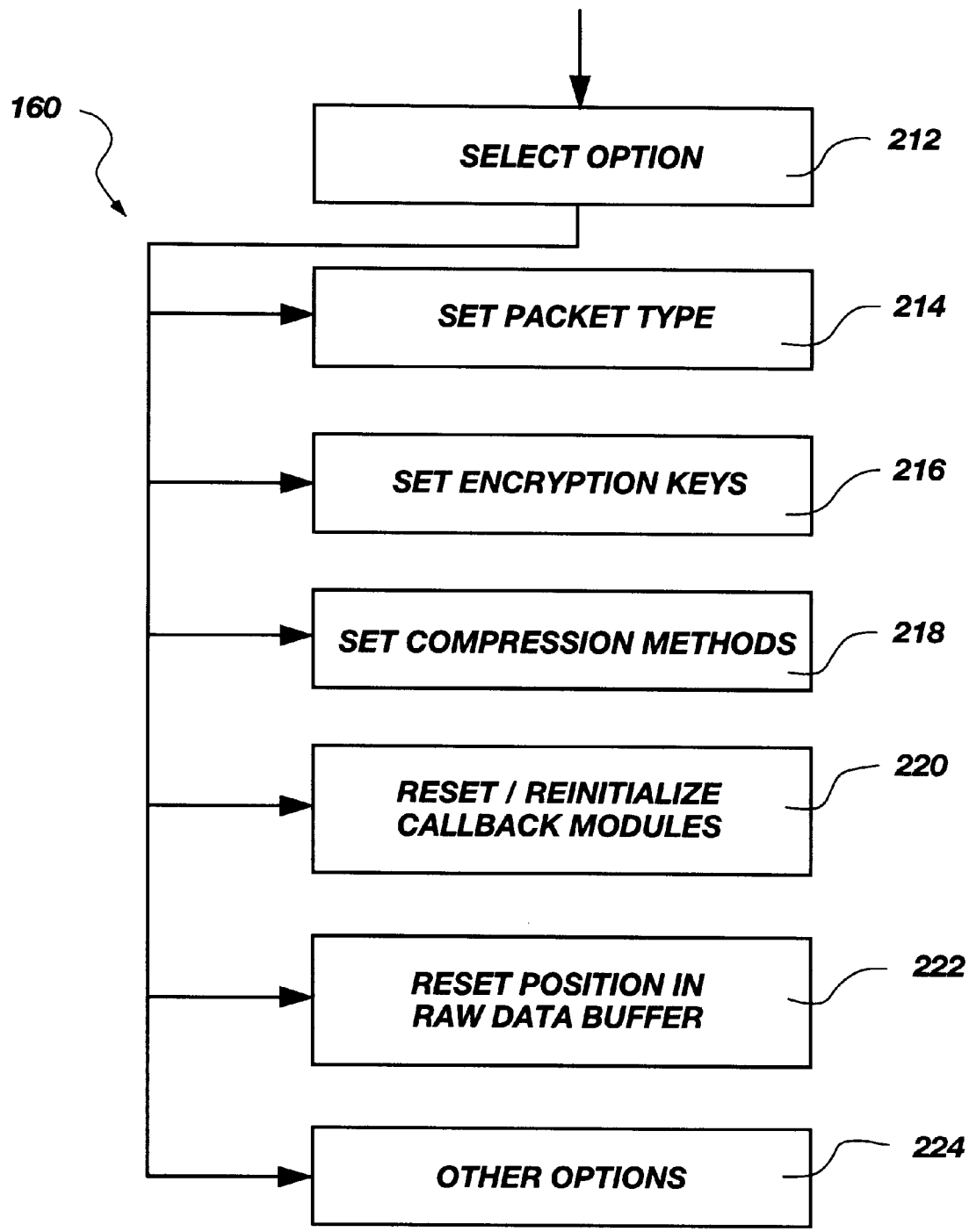
FIG. 9 is a schematic block diagram of the configuration process illustrated in FIG. 6 for a state buffer.

Referring now to FIG. 9, a configure state buffer 160 (configure module 160) may provide a selection 212 of options. That is, an application 140 may set values corresponding to internal states in the state buffer 152 and packet buffer 150. Accordingly, different set executables 214, 216, 218, 220, 222, 224 may be provided. An application 140 may select any one of the set executables 214–224, one at a time. A set packet type 214 effects the value of a packet type 118 for corresponding to creation of a packet 100. The set encryption keys 216 may operate to set encryption keys during creation of a packet 100 or during or in preparation for decryption of a packet 100. Likewise, the set compression methods executable 218 may be effective to set a compression method for creating a packet, but is unnecessary in decompression, being previously defined. A reset executable 220 may be effective to reset or reinitialize the callback routines 143 or callback modules 143. The reset executable 220 may assign, reassign, or unassign one or more callback modules 143. A reset position executable 222 may reset a pointer, offset, or other indicator in the raw data buffer 148. The reset position 222 may be effective to skip data that is not desired to be read or transferred for an application 140. In addition to the set executables 214–222, other options 224 may change additional states of data structures within the memory device 14. That is, state elements in the state buffer 152 may be effected as desired or required by an application 140.

Figure 10:
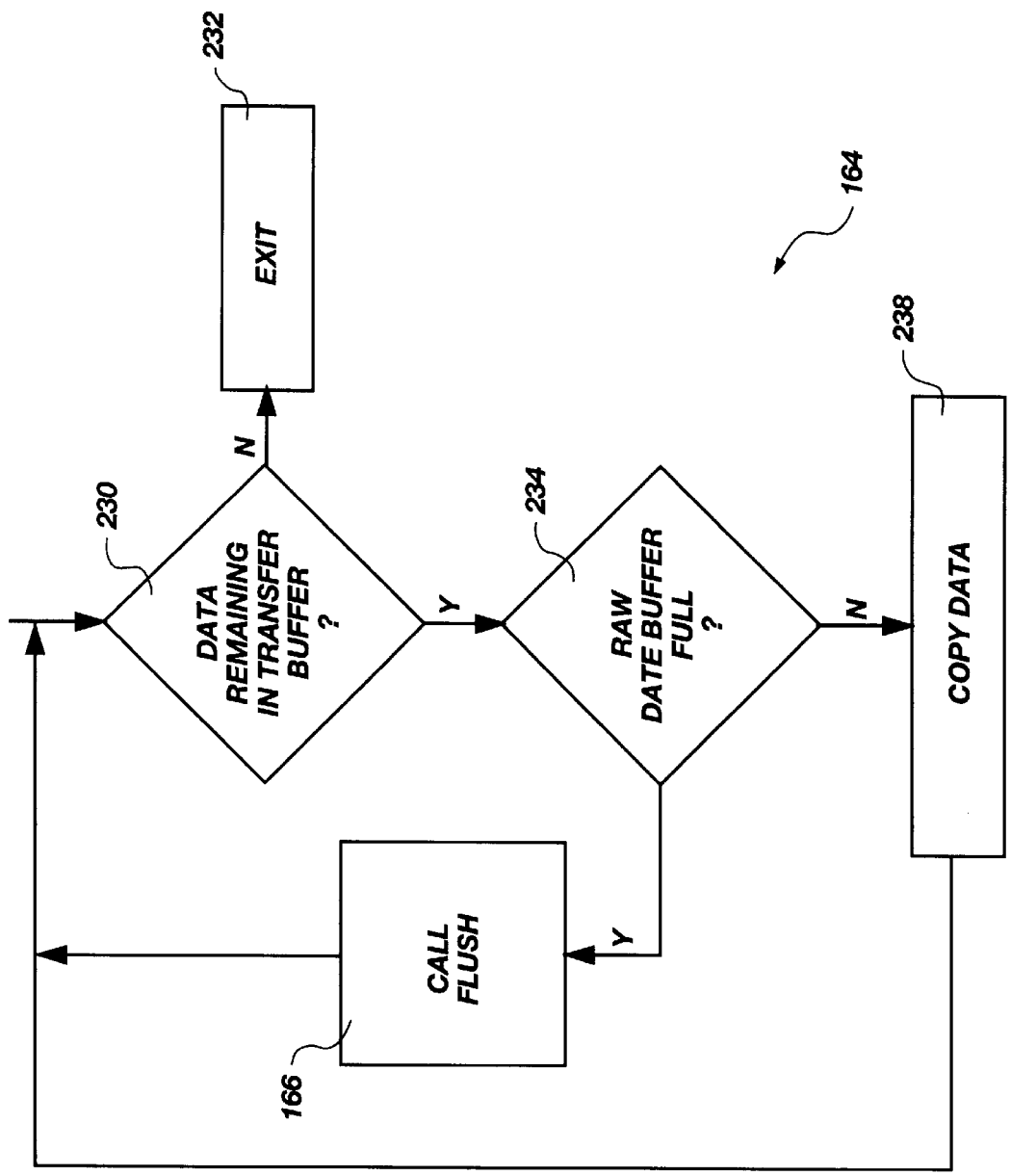
FIG. 10 is a schematic block diagram of a write process for substantive data, as illustrated in FIG. 6.

Referring now to FIG. 10, a write module 164 is an executable providing a write process for copying data from the transfer buffer 144 to the raw data buffer 148. In one embodiment, the write module 164 may include a test 230 to determine whether or not data remains within the transfer buffer 148. A negative response to the test 230 may result in an exit 232 from the module 164. A test 234 may determine whether or not the raw data buffer 148 is full. A positive response to the test 234 may result in execution of the flush module 166, followed by a return to the test 230.

A negative response to the test 234 may result in a copy 238 effective to copy data from the transfer buffer 144 to the raw data buffer 148.

Figure 11:
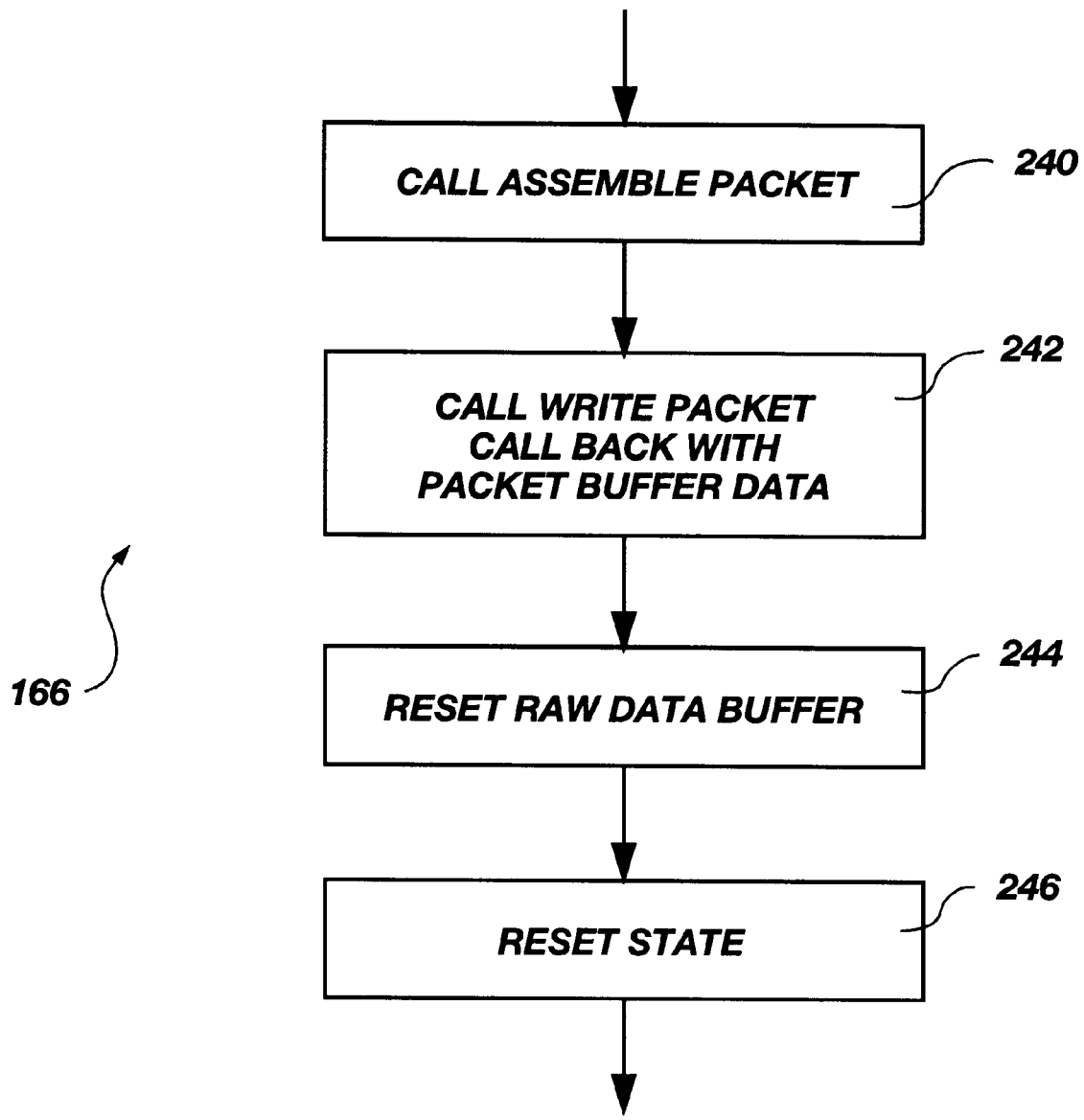
FIG. 11 is a schematic block diagram of the flush process of FIG. 6.

Referring now to FIG. 11, the flush module 166 may include a call to execute the assemble packet module 168. Likewise, following the call 240, a call 242 may call the write packet callback module 143b, executing the same to pass a packet 100 from the packet buffer 150 to the application 140. Thereafter, a reset executable 244 may be effective to reset the raw data buffer 148. A reset executable 246 may then reset elements within the state buffer 152 that pertain to the flush module 166.

Figure 12:
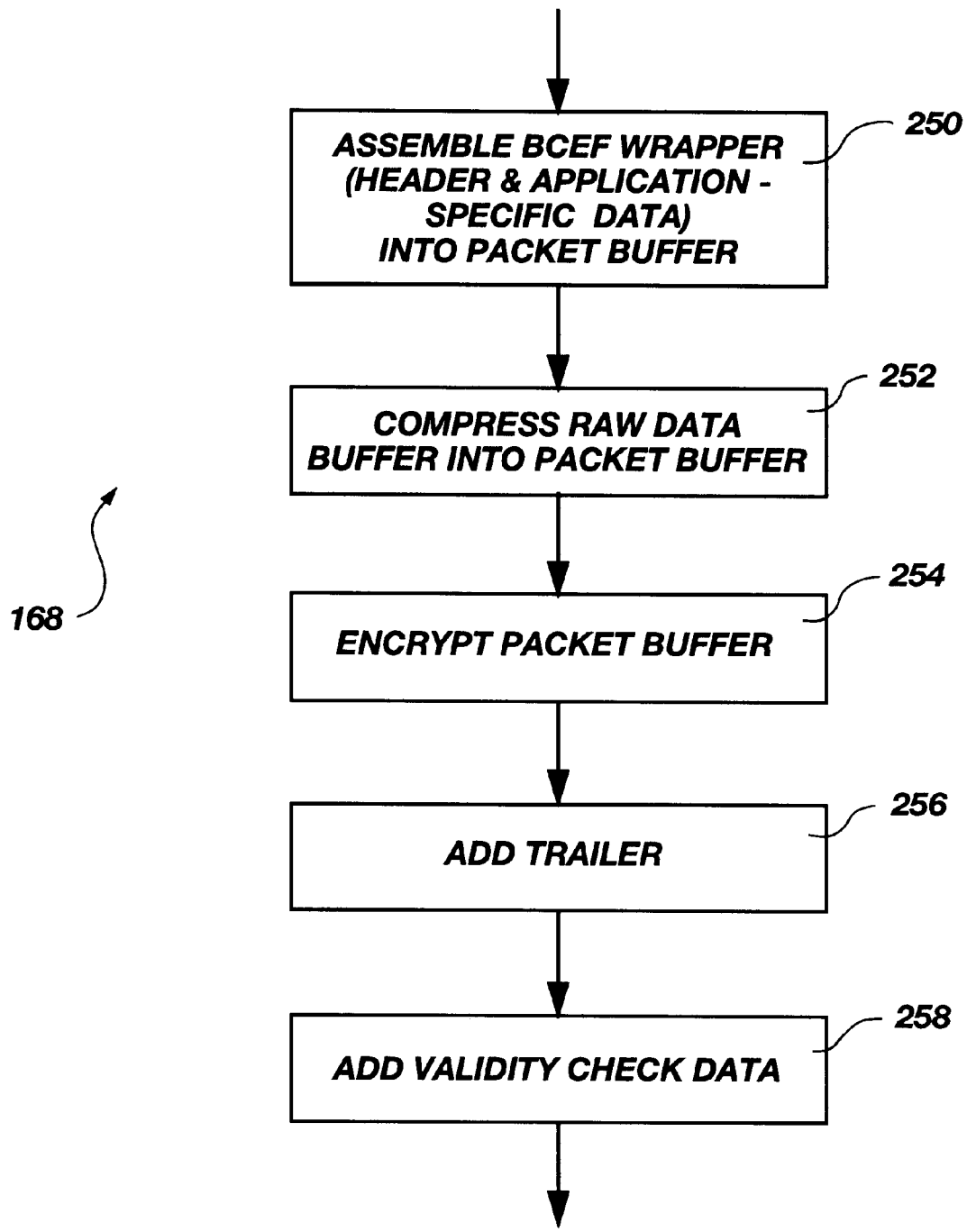
FIG. 12 is a schematic block diagram of the assemble packet process of FIG. 6.

Referring now to FIG. 12, an assemble executable 250 in the assemble packet module 168 may be effective to assemble a BCEF wrapper header 108. The assemble executable 250 may use an application-specific header data block 110 already created by the add module 162. Accordingly, the assemble executable 250 may assemble the elements 111 of the header 108 to the data 110 to form the wrapper 102.

A compressed executable 252 may compress raw data obtained from the raw data buffer 148 into the packet buffer 150. The compressed executable 252 may append compressed data to the wrapper 102 to form the packet 100. However, the compressed executable 252 and a following encrypt executable 254 as well as a validity check executable 258 may all be optionable. Nevertheless, a packet 100 may not be considered completed until any designated executable 252, 254, 258 has been completed.

An encrypt executable 254 may be effective to encrypt the contents of the packet buffer 150, while the validity check executable 258 may be effective to add a validity check such as CRC, checksum, or the like in accordance with the flags 122. A trailer executable 256 may add a trailer 106 to a packet 100, but may be optional.

Figure 13:
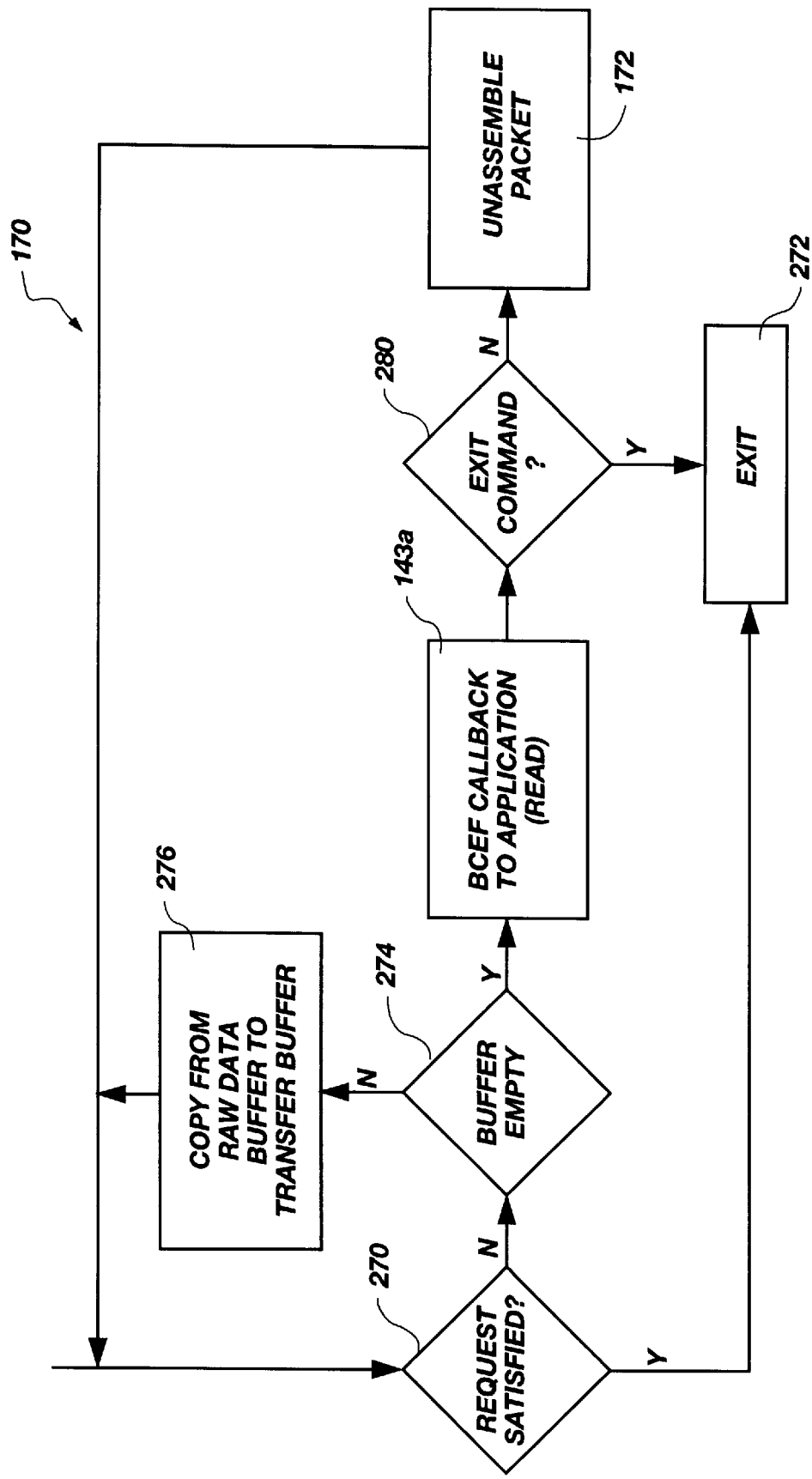
FIG. 13 is a schematic block diagram of the read raw substantive data process illustrated in FIG. 6.

Referring now to FIG. 13, the read module 170 may include a test 270 to determine whether or not a request has been satisfied as received from an application 140. For example, an application 140 may place a read request with the BCEF modules 146. Accordingly, the read module 170 may act on that request. If the test 270 results in a positive response, the exit executable 272 may exit the read module 170. A negative response to the test 270 may be followed by a test 274 to determine whether or not the raw data buffer 148 is empty. A negative response to the test 274 results in a copy executable 276 operating to copy from the raw data buffer 148 an appropriate piece of data to the transfer buffer 144. A positive response to the test 274 results in execution of the read packet callback module 143a. Following execution of the module 143a, a test 280 may determine whether or not an exit command has been received from the application 140. If an exit command has been received, then the exit executable 272 terminates the execution of the read module 170. A negative response to the test 280 advances the module 170 to an execution of the unassemble packet 172. Following execution of the unassemble packet 172, the process 170 or module 170 returns to the test 270.

Figure 14:
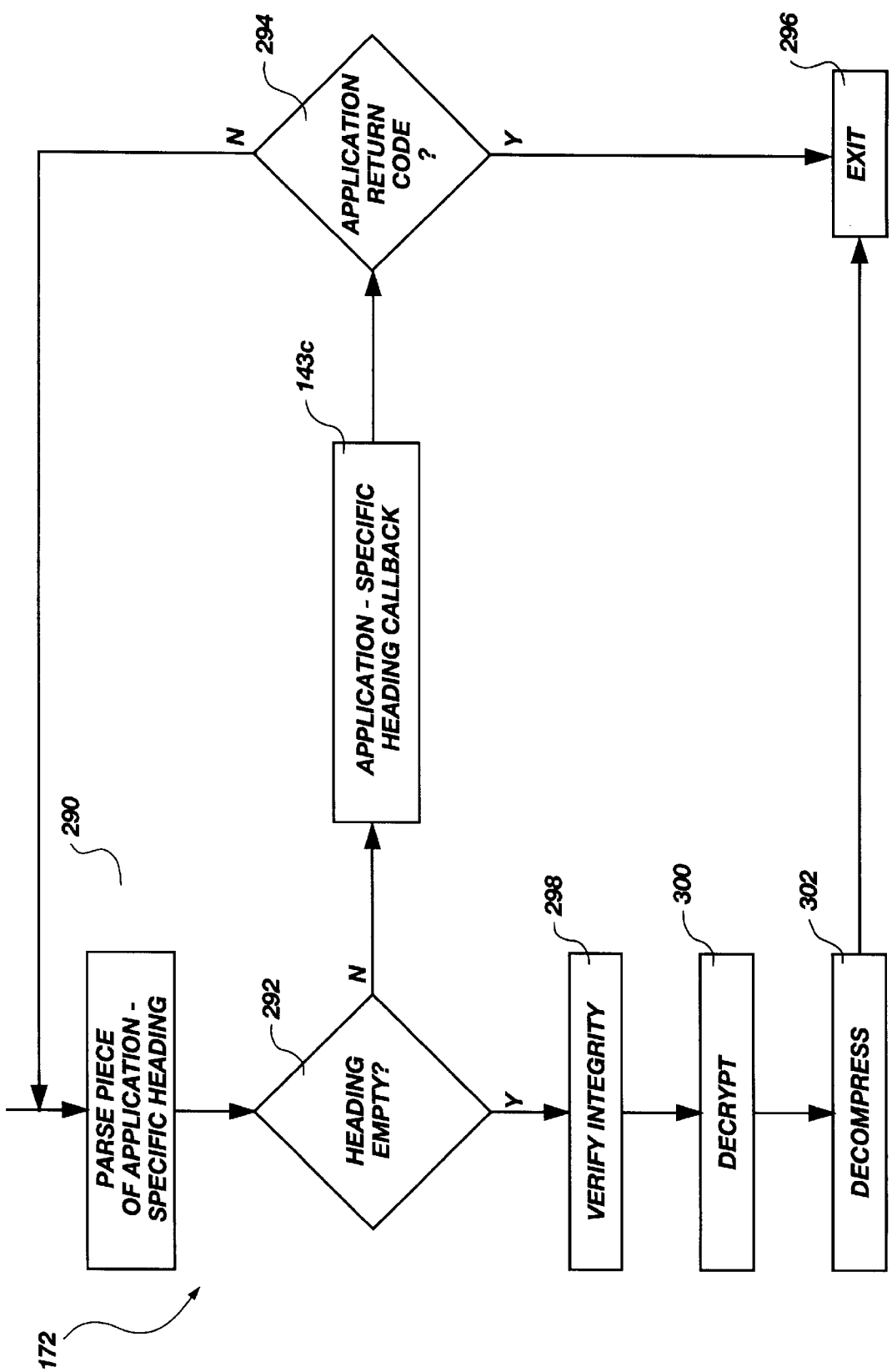
FIG. 14 is a schematic block diagram of the unassemble packet module illustrated in FIG. 6.

Referring now to FIG. 14, a module 172, an unassemble packet module 172, may include a parse executable 290 effective to parse some portion or piece of an application-specific heading data 132. Thereafter, a test 292 may determine whether or not the heading data 132 has been completely read. A negative response to the test 292 may result in execution of a call to an execution of the application-specific heading callback module 143c. A test 294 may determine whether or not a return code has been received from the application. A negative response returns the process 172 or module 172 back to the parse executable 290. A positive response to the test 294 advances the process 172 to an exit executable 296 terminating execution of the module 172. A positive response to the test 292 may result in execution of any of the executables 298, 300, 302 that are appropriate in view of the flags 122 set in the header 108. Accordingly, a verify executable 298 may verify the integrity of the packet 100 according to a checksum, CRC, or the like. A decrypt executable 300 may decrypt a packet 100 that has undergone encryption according to an encryption flag 122. A decompress executable 302 may decompress a packet 100 that has undergone an compression due to a decompression flag 122 in the header 108.

From the above discussion, it will be appreciated that the present invention provides packets that may be persistent. Moreover, substantive data need not be accessed by processes involved in transferring packets. This speeds transfer and improves data integrity and security.

The present invention may be embodied in other specific forms without departing from its spirit or essential characteristics. The described embodiments are to be considered in all respects only as illustrative, and not restrictive. The scope of the invention is, therefore, indicated by the claims, rather than by the foregoing description. All changes which come within the meaning and range of equivalency of the claims are to be embraced within their scope.

What is claimed and desired to be secured by United States Letters Patent is:

1. An apparatus for transferring and storing data in a packet adapted to be persistent throughout transfer, the apparatus comprising:

a processor hosting an application containing a first process providing substantive data;

the processor executing a packeting module distinct from the first process, to create a packet having a wrapper and adapted to be persistent throughout transfer, the wrapper including a header and application-specific data, the application-specific data being distinct from the header and relating to the substantive data;

a memory device operably connected to the processor to store the packet with an application-specific data block storing the application-specific data independently from the substantive data; and a destination device operably connected to the memory device to receive the packet from the application, the application receiving the packet from the packeting module in response to a request from the application.

2. The apparatus of claim 1 wherein the header contains an identification corresponding to a packet determined by the application and provided to the packeting module.

3. The apparatus of claim 2 wherein the identification is interpretable by the application and the packeting module.

4. The apparatus of claim 1 further comprising an intermediary device hosting a related application and connected to receive the packet from the processor and to selectively determine disposition of the substantive data, and wherein the wrapper contains sufficient processing information interpretable by the related application to enable the intermediary device to determine how to dispose of the packet.

5. The apparatus of claim 4 wherein disposition is selected from forwarding the packet to the destination device, processing the substantive data, and destroying the packet.

6. The apparatus of claim 5 wherein the related application is the application executing on the intermediary device.

7. The apparatus of claim 1 wherein the processor further comprises a first processor executing the first process, and a second processor executing the packeting process.

8. The apparatus of claim 1 wherein the destination device is associated with a computer that is remote from the first processor and connected thereto across a network.

9. The apparatus of claim 1 wherein the destination device is a memory device.

10. The apparatus of claim 1 wherein the destination device is a non-volatile storage device.

11. The apparatus of claim 10 wherein the non-volatile storage device contains a persistent storage location for storing thereto and retrieving therefrom the packet.

12. The apparatus of claim 11 wherein the retrievable storage location is a database.

13. The apparatus of claim 12 wherein the substantive data corresponds to a binary large object.

14. The apparatus of claim 1 wherein the substantive data corresponds to a binary large object.

15. The apparatus of claim 11 wherein the substantive data includes only a portion of a binary large object.

16. The apparatus of claim 1 wherein the packeting module further comprises an alteration process effective to selectively alter the substantive data, the alteration process being selected from an encryption process, a compression process, and an integrity verification process.

17. A memory device storing executables and data to transfer and store data in a packet adapted to be persistent throughout transfer, the memory device comprising:

an application block storing an application containing a first process effective to provide substantive data when executed on a processor;

a packeting module block storing a packeting module distinct from the first process, and effective to be executed on a processor to create a packet adapted to be persistent throughout transfer;

a packet buffer for storing a packet, the packet buffer containing a substantive data block containing substantive data;

the packet buffer storing a wrapper block, distinct from the substantive data block, containing wrapper data interpretable by the application and the packeting process.

18. The memory device of claim 17 wherein the wrapper includes a header and application-specific data, the application-specific data being distinct from the header and relating to the substantive data.

19. The memory device of claim 18 wherein the application-specific data further comprises application-specific heading data effective to direct the destination device on how to dispose of the packet.

20. The memory device of claim 17 wherein the wrapperblock contains an identification corresponding to a packet type determined by the application and provided to the packeting module when executing, the identification being interpretable by the application and the packeting module.

21. The memory device of claim 17 further comprising a raw data buffer for containing the substantive data received from the process and providing the substantive data to the packeting module.

22. The memory device of claim 17 further comprising a callback block storing a callback module executable on the processor and effective to transfer the packet between the application and the packeting module.

23. A method of packetizing data in a packet adapted to be persistent throughout transfer, the method comprising:

providing a processor hosting an application containing a first process providing substantive data;

providing a packeting module distinct from the first process;

creating a packet adapted to be persistent throughout transfer by the packeting module, including creating a wrapper comprising a header and an application-specific data block, the application-specific data block being distinct from the header, and relating to, but stored independently from, the substantive data in the packet;

providing to the packet the substantive data;

transferring the packet to the application; and transferring the packet from the application to a destination device.

24. The method of claim 23 wherein the wrapper contains an identification corresponding to a packet type determined by the application and provided to the packeting module.

25. The method of claim 24 wherein the identification is interpretable by the application and the packeting module.

26. The method of claim 23 wherein the application-specific data is stored in a format interpretable by the application and the packeting module.

27. The method of claim 23 wherein the application-specific data block is accessible directly only by the packeting process, and is interpretable only by the application upon receipt of the application-specific data from the packeting module.

28. The method of claim 23 wherein the packet is persistent after transferring to the destination device.

29. The method of claim 23 further comprising providing a non-volatile storage device as the destination device, and wherein the packet is selectively retrievable from the storage device.

30. The method of claim 23 wherein the packet is selectively persistent after transferring to the destination device, and wherein the application is effective to determine the disposition of the packet.

31. The method of claim 23 wherein the application-specific data block is stored in a format effective to be interpretable exclusively by the packeting process.

32. The method of claim 23 wherein the destination device is the processor, the packet being transferred to a second process executing on the processor.

33. The method of claim 23 further comprising providing a remote computer and a network operably connecting the processor to the remote computer, and wherein the destination device is associated with the remote computer.

34. The method of claim 23 further comprising selectively encrypting, by the packeting process, the substantive data to be placed in the packet.

35. The method of claim 34 further comprising providing by the application to the packeting process an encryption key to be used for encryption.

36. The method of claim 23 wherein the application-dependent data is selected from data effective to provide an encryption key; further describe the substantive data; further annotate the substantive data; summarize the substantive data; define a method of operating on the substantive data; identify a source of the substantive data; provide file identification data associated with the substantive data; identify a sender of the packet; identify access rights associated with the packet; and identify a network role of the application running on the processor.

37. The method of claim 23, wherein the header data includes a packet length and a packet type describing the substantive data to the application and the packeting module.

38. The method of claim 23 wherein the packeting module is programmed to provide selective encryption, compression, and validation data for the packet in response to an instruction from the application.

39. The method of claim 38 further comprising receiving the packet by the destination device, and wherein the packeting module is programmed to provide selective decryption, decompression, and validation of the packet in response to an instruction from the destination device.

* * * * *